United States Patent
Matsuo et al.

(10) Patent No.: US 7,352,106 B2
(45) Date of Patent: Apr. 1, 2008

(54) PIEZOELECTRIC TRANSFORMER DRIVING APPARATUS

(75) Inventors: Yasuhide Matsuo, Tokyo (JP); Akira Mizutani, Saitama (JP)

(73) Assignee: Tamura Corporation, Tokyo (JP)

( * ) Notice: Subject to any disclaimer, the term of this patent is extended or adjusted under 35 U.S.C. 154(b) by 186 days.

(21) Appl. No.: 10/572,734

(22) PCT Filed: Oct. 1, 2004

(86) PCT No.: PCT/JP2004/014478

§ 371 (c)(1),
(2), (4) Date: Mar. 21, 2006

(87) PCT Pub. No.: WO2005/034322

PCT Pub. Date: Apr. 14, 2005

(65) Prior Publication Data

US 2007/0120440 A1    May 31, 2007

(30) Foreign Application Priority Data

Oct. 3, 2003  (JP)  ............................. 2003-345547

(51) Int. Cl.
 *H01L 41/08*  (2006.01)
(52) U.S. Cl. .................. 310/316.01; 310/317
(58) Field of Classification Search ........... 310/316.01, 310/317, 319
See application file for complete search history.

(56) References Cited

U.S. PATENT DOCUMENTS

| | | | |
|---|---|---|---|
| 4,459,505 A * | 7/1984 | Lim | 310/318 |
| 6,087,757 A | 7/2000 | Honbo et al. | |
| 6,724,126 B2 * | 4/2004 | Chou | 310/318 |
| 2005/0285476 A1 * | 12/2005 | Chou et al. | 310/317 |

FOREIGN PATENT DOCUMENTS

| | | |
|---|---|---|
| JP | H06-19299 | 3/1994 |
| JP | 10-200174 | 7/1998 |
| JP | 11-8087 | 1/1999 |
| JP | 2000-078741 | 3/2000 |
| JP | 2000-150190 | 5/2000 |
| JP | 2001-085759 | 3/2001 |
| JP | 2003-033046 | 1/2003 |

* cited by examiner

Primary Examiner—Mark Budd
(74) Attorney, Agent, or Firm—Dennis G. LaPointe

(57) ABSTRACT

The present invention provides a piezoelectric transformer driving apparatus which drives a load balanced to the ground, which makes an insulating component, such as a current transformer or a photocoupler, unnecessary, and which can detect a load current. For this reason, the present invention has two secondary windings (1B, 1C) which generate AC drive voltages respectively, a piezoelectric transformer (2) which generates a high voltage AC from the drive voltage generated by the secondary winding (1B) and applies this AC to one terminal of a cold-cathode tube (201), a piezoelectric transformer (3) which generates a high voltage AC of polarity reverse to the piezoelectric transformer (2) from the drive voltage generated by the secondary winding (1C), and applies this AC to the other terminal of the cold-cathode tube (201), and a detection part (4) which is connected between the secondary windings (1B) and (1C), in which a load current flowing into the cold-cathode tube (201) flows, and which detects this load current.

6 Claims, 4 Drawing Sheets

PIEZOELECTRIC TRANSFORMER DRIVING APPARATUS

TECHNICAL FIELD

The present invention relates to a piezoelectric transformer driving apparatus which not only drives a load having no earth point and being balanced to the ground, but also detects a load current which flows into this load.

BACKGROUND ART

As loads without an earth point, there are cold-cathode tube and so on, and it is necessary to adjust a voltage applied to such a load to be constant. In consequence, in order to detect a load current which flows into a load, an insulating component represented by a current transformer or a photocoupler is required. That is, it is necessary that a piezoelectric transformer driving apparatus keeps an insulating state to a load circuit without an earth point.

FIG. 4 is an explanatory diagram explaining current detection of a balanced output using a current transformer in a conventional example (patent document 1: Japanese Patent Laid-Open No. 2001-85759). In FIG. 4, reference numeral 101 denotes a signal source, reference numeral 102 denotes a load, reference numeral 103 denotes a current transformer, and reference numeral 104 denotes a resistor. One terminal of the signal source 101 is connected to one terminal of the load 102, and the other terminal is connected to the other terminal of the load 102 through the current transformer 103. In addition, one terminal of a secondary side of the current transformer 103 is grounded.

If a turn ratio of a primary side and a secondary side of the current transformer 103 is 1:n, if a voltage of the resistor 104 connected to the secondary side is Vd, and if a load current which flows into the load 102 is Io, then the relation of the load current Io is expressed by the following formula 1.

$$Vd = R \cdot Io/n \qquad \text{formula 1}$$

Hence, the load current Io is expressed by the following formula 2.

$$Io = n \cdot Vd/R \qquad \text{formula 2}$$

In addition, in formulas 1 and 2, R is a value of the resistor 104. The load current Io is detected from formula 2. On the basis of the detected load current Io, a frequency and a voltage of an output of the signal source 101 are controlled, and a voltage applied to the load 102 is adjusted automatically.

However, in the conventional example mentioned above, in order to keep an insulating state to the load 102, the current transformer 103 which is an insulating component is used. In addition, there are some which use a photocoupler instead of the current transformer 103. There is a problem that use of these insulating components results in an increase of component costs and manufacturing steps, and leads to a cost increase of a product.

The present invention aims at providing a piezoelectric transformer driving apparatus which solves the above-mentioned problem, and not only drives a load balanced to the ground, but also makes insulating components, such as a current transformer and a photocoupler, unnecessary, and can detect a load current.

DISCLOSURE OF THE INVENTION

In order to solve the problem, the present invention is a piezoelectric transformer driving apparatus characterized by comprising two driving parts which generate AC drive voltages, respectively, a first piezoelectric transformer which generates a high voltage AC from a drive voltage generated by one of the driving parts, and applies this AC to one terminal of a load, a second piezoelectric transformer which generates a high voltage AC with polarity reverse to the first piezoelectric transformer, from a drive voltage generated by the other driving part, and applies this AC to the other terminal of the load, and a detection part which is connected between the one of the driving parts and the other driving part, in which a load current flowing into the load flows, and which detects this load current.

The present invention is characterized in that, in the above-mentioned piezoelectric transformer driving apparatus, the respective driving parts are secondary windings provided to primary windings of transformers, that the primary winding of one of the transformers and the primary winding of the other transformer are connected with each other in series, and that the first piezoelectric transformer is driven by an AC drive voltage generated by the secondary winding of the one of the transformers, and the second piezoelectric transformer is driven by a drive voltage generated by the secondary winding of the other transformer.

The present invention is characterized in that, in the above-mentioned piezoelectric transformer driving apparatus, the detection part has a first resistor connected with the secondary winding of the one of the transformers, and a second resistor which is connected with the secondary winding of the other transformer and is connected with the first resistor in series, and that a junction of the two resistors is grounded.

The present invention is a piezoelectric transformer driving apparatus characterized by comprising two driving parts which generate AC drive voltages, respectively, a first piezoelectric transformer which generates a high voltage AC from a drive voltage generated by one of the driving parts, and applies this AC to one terminal of a load, a second piezoelectric transformer which generates a high voltage AC with polarity reverse to the first piezoelectric transformer, from a drive voltage generated by the other driving part, and applies this AC to the other terminal of the load, and a detection part which is connected with one of the driving parts and detects a load current which flows into the load, from a current which flows between this driving part and the ground.

The present invention is characterized in that, in the above-mentioned piezoelectric transformer driving apparatus, the respective driving parts are secondary windings provided to primary windings of transformers, that the primary winding of one of the transformers and the primary winding of the other transformer are connected with each other in series, and that the first piezoelectric transformer is driven by an AC drive voltage generated by the secondary winding of the one of the transformers, and the second piezoelectric transformer is driven by a drive voltage generated by the secondary winding of the other transformer.

The present invention is characterized in that, in the above-mentioned piezoelectric transformer driving apparatus, the detection part is a resistor, one terminal of which is connected with the secondary winding of one of the transformers, and the other terminal of which is grounded.

According to the above-mentioned construction, a first piezoelectric transformer and a second piezoelectric transformer are driven by a first driving part and a second driving part respectively. Drive currents which drive the two piezoelectric transformers flow respectively in a circuit formed by the first piezoelectric transformer and the one driving part, and another circuit formed by a second piezoelectric transformer and the other driving part. On the other hand, since a load current which flows into the load flows in a circuit formed by the first piezoelectric transformer, the second piezoelectric transformer, and the detection part, it is possible to separate the current which drives the two transformers, from the load current which flows into the load.

Thereby, according to the present invention, since it is possible to separate the current which drives the two transformers, from the load current which flows into the load, it is possible to detect the load current surely and to make insulating components, such as a current transformer and a photocoupler, unnecessary.

According to the present invention, since the driving parts are constructed of transformers and the detection part is constructed of two resistors, it is possible to make circuit structure simple.

BEST MODE FOR CARRYING OUT THE INVENTION

Next, embodiments of the present invention will be explained.

Figure 1:
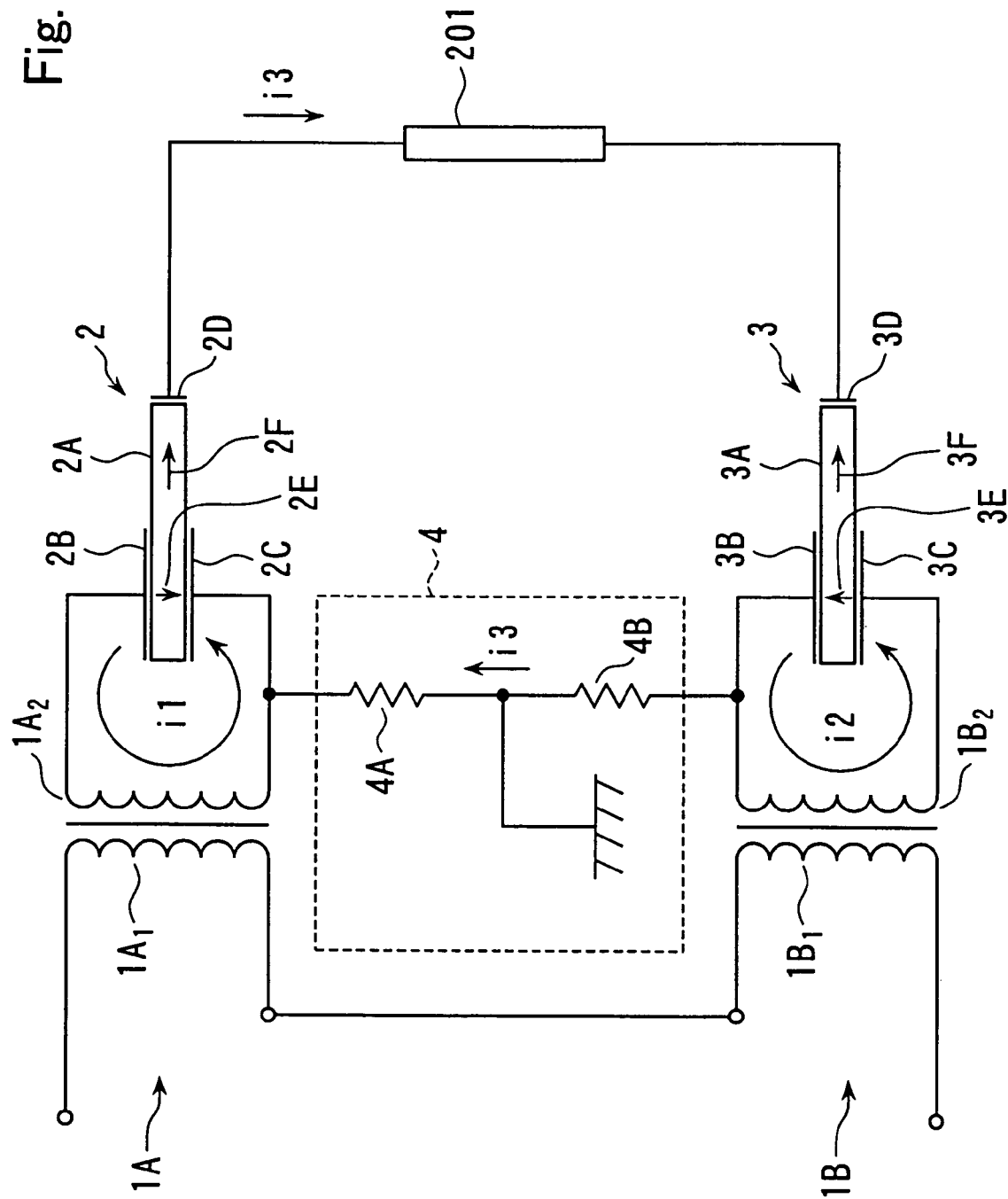
FIG. 1 is a fundamental block diagram showing a piezoelectric transformer driving apparatus according to a first embodiment of the present invention.

FIG. 1 shows a piezoelectric transformer driving apparatus according to a first embodiment. In order to turn on a cold-cathode tube 201 as a load, the piezoelectric transformer driving apparatus in FIG. 1 supplies a high voltage to the cold-cathode tube 201, and simultaneously, detects a load current i3 which flows in the cold-cathode tube 201. This piezoelectric transformer driving apparatus is constructed with transformers 1A and 1B, piezoelectric transformers 2 and 3, and a detection part 4.

The transformer 1A is constructed with a primary winding $1A_1$, and a secondary winding $1A_2$, while the transformer 1B is constructed with a primary winding $1B_1$ and a secondary winding $1B_2$. The primary winding $1A_1$ of the transformer 1A and the primary winding $1B_1$ of the transformer 1B are connected in series. When a high-frequency alternating current is applied to the primary winding $1A_1$, and the primary winding $1B_1$, the secondary winding $1A_2$ and secondary winding $1B_2$ generate AC drive voltages, respectively. The secondary winding $1A_2$ applies an AC drive voltage to the piezoelectric transformer 2, and the secondary winding $1B_2$ applies a drive voltage to the piezoelectric transformer 3. At this time, a drive current i1 flows into the secondary winding $1A_2$, and a drive current i2 flows into the secondary winding $1B_2$.

In addition, the detection part 4 is connected between the secondary winding $1A_2$ of the transformer 1A and the secondary winding $1B_2$ of the transformer 1B. The detection part 4 is constructed with resistors 4A and 4B connected in series. A junction of the resistor 4A and resistor 4B is grounded.

The piezoelectric transformer 2 comprises a piezoelectric plate 2A, primary electrodes 2B and 2C, and a secondary electrode 2D. When a high-frequency drive voltage is applied to the primary electrodes 2B and 2C from the secondary winding $1A_2$ of the transformer 1A, the piezoelectric transformer 2 converts electrical energy into mechanical energy, and thereafter converts this mechanical energy into electrical energy to generate a high-frequency high voltage in the secondary electrode 2D. Similarly, the piezoelectric transformer 3 comprises a piezoelectric plate 3A, primary electrodes 3B and 3C, and a secondary electrode 3D. When a high-frequency drive voltage is applied to the primary electrodes 3B and 3C from the secondary winding $1B_2$ of the transformer 1B, the piezoelectric transformer 3 generates a high-frequency high voltage in the secondary electrode 3D in the same manner as the piezoelectric transformer 2. The cold-cathode tube 201 is connected to the secondary electrode 2D of the piezoelectric transformer 2, and to the secondary electrode 3D of the piezoelectric transformer 3. Hence, the high-frequency high voltages which the piezoelectric transformers 2 and 3 generate are applied to the cold-cathode tube 201.

Polarization has been performed in directions of arrows 2E and 3E in primary sides of the piezoelectric transformers 2 and 3, and polarization has been performed in directions of arrows 2F and 3F in the secondary sides. Therefore, when the voltages of the secondary windings $1A_2$ and $1B_2$ of the transformers 1A and 1B change in order of positive, then negative, the high-frequency voltage from the secondary electrode 2D of the piezoelectric transformer 2 changes in order of positive, then negative, while the high-frequency voltage from the secondary electrode 3D of the piezoelectric transformer 3 changes in order of negative, then positive. Thus, the voltage from the piezoelectric transformer 2, and the voltage from the piezoelectric transformer 3 of polarity reverse to the piezoelectric transformer 2 are applied to the cold-cathode tube 201.

The high-frequency voltages from the piezoelectric transformers 2 and 3 light the cold-cathode tube 201 and the load current i3 flows into the cold-cathode tube 201. The load current i3 flows through the piezoelectric transformer 3, into the resistors 4B and 4A of the detection part 4. Furthermore, it flows from the detection part 4 through the piezoelectric transformer 2 into the cold-cathode tube 201. Alternatively, the load current i3 flows into the reverse direction. At this time, the current i1 which drives the piezoelectric transformer 2 flows between the secondary winding $1A_2$, and the primary electrodes 2B and 2C of the piezoelectric transformer 2, while the current i2 which drives the piezoelectric transformer 3 flows between the secondary winding $1B_2$ and the primary electrodes 3B and 3C of the piezoelectric transformer 3. Thus, only the load current i3 of the cold-cathode tube 201 flows in the detection part 4. In consequence, the detection part 4 can detect the load current i3 from a voltage drop of the resistors 4A and 4B generated by the load current i3.

In this way, according to this embodiment, the cold-cathode tube 201 can be driven, while the insulating component, such as a current transformer or a photocoupler needed in conventional technology is made unnecessary, and the load current i3 flowing in the cold-cathode tube 201 can be detected.

Figure 2:
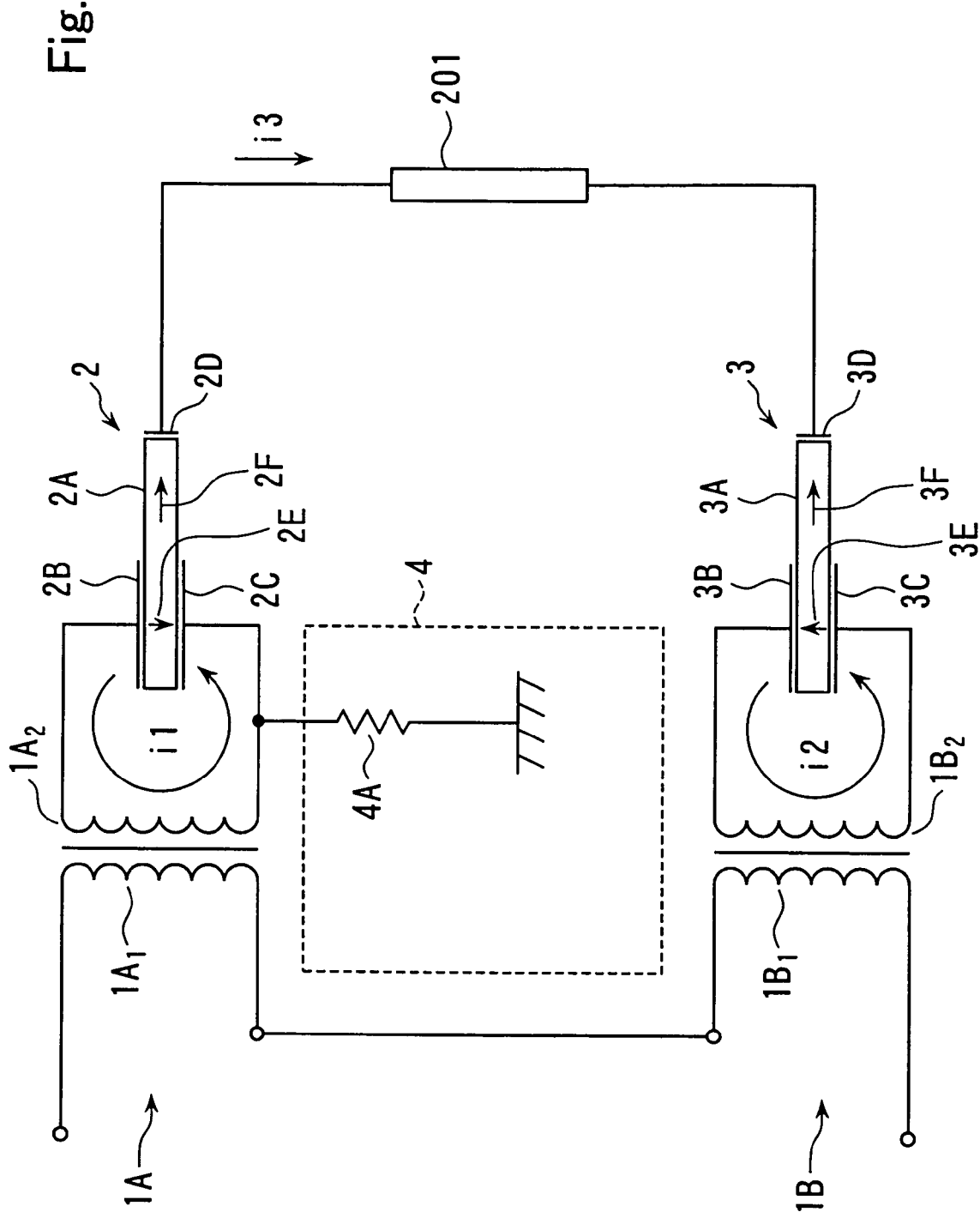
FIG. 2 is a fundamental block diagram showing a piezoelectric transformer driving apparatus according to a second embodiment of the present invention.

FIG. 2 shows a piezoelectric transformer driving apparatus according to a second embodiment. In this piezoelectric transformer driving apparatus, the piezoelectric transformer driving apparatus in FIG. 1 has been changed in the following manner. Namely, it is made to have such a structure that with the resistor 4B of the detection part 4 in FIG. 1 being removed, a terminal of the resistor 4A is grounded. Also by a such structure, the detection part 4 can detect the load current i3 which flows in the cold-cathode tube 201.

In here, although the structure without the resistor 4B in FIG. 1 is used in this embodiment, the load current i3 which flows in the cold-cathode tube 201 can be detected similarly also with a structure in which the resistor 4A of the detection part 4 in FIG. 1 is removed and a terminal of the resistor 4B is grounded.

Figure 3:
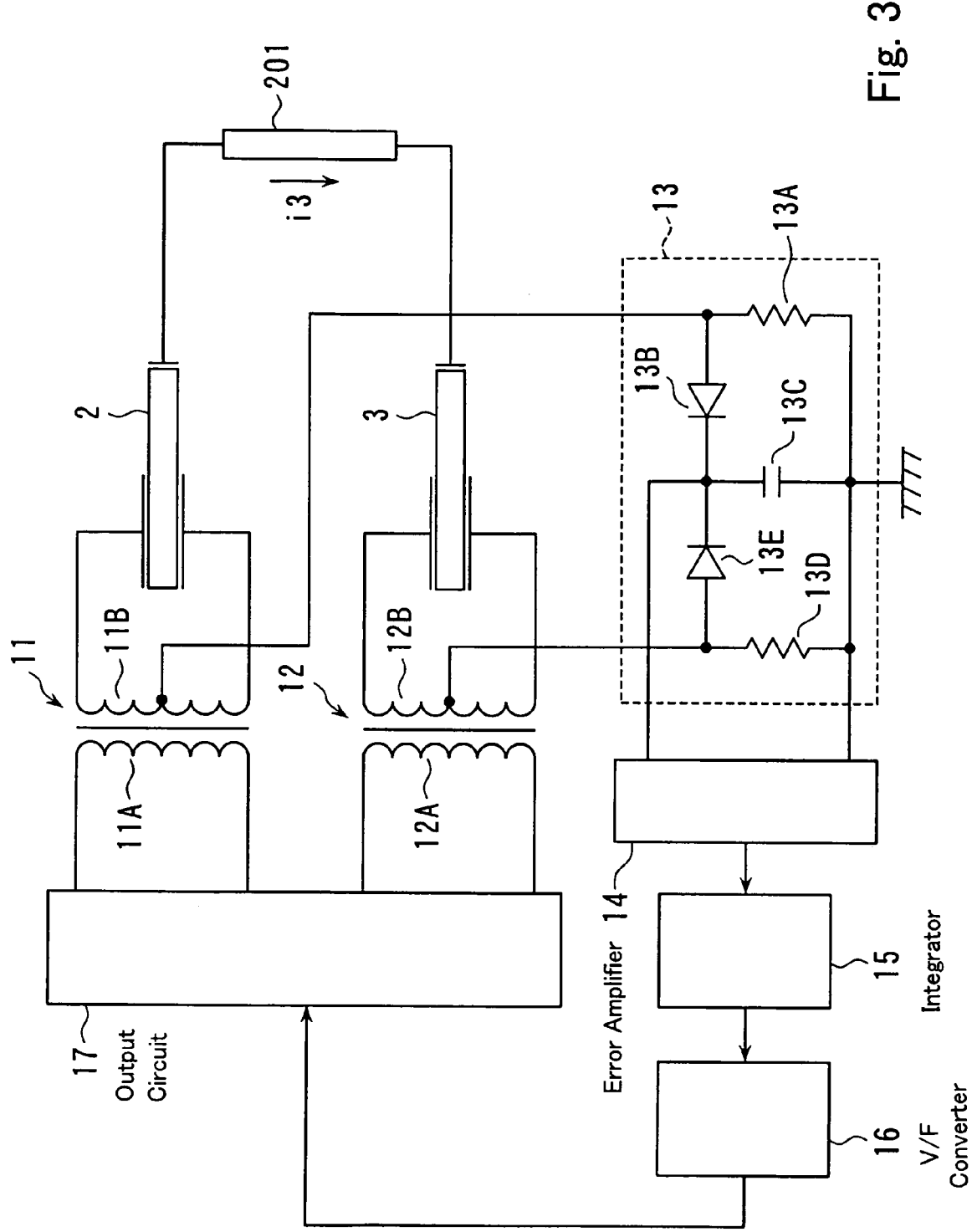
FIG. 3 is a fundamental block diagram showing a piezoelectric transformer driving apparatus according to a third embodiment of the present invention.
Figure 4:
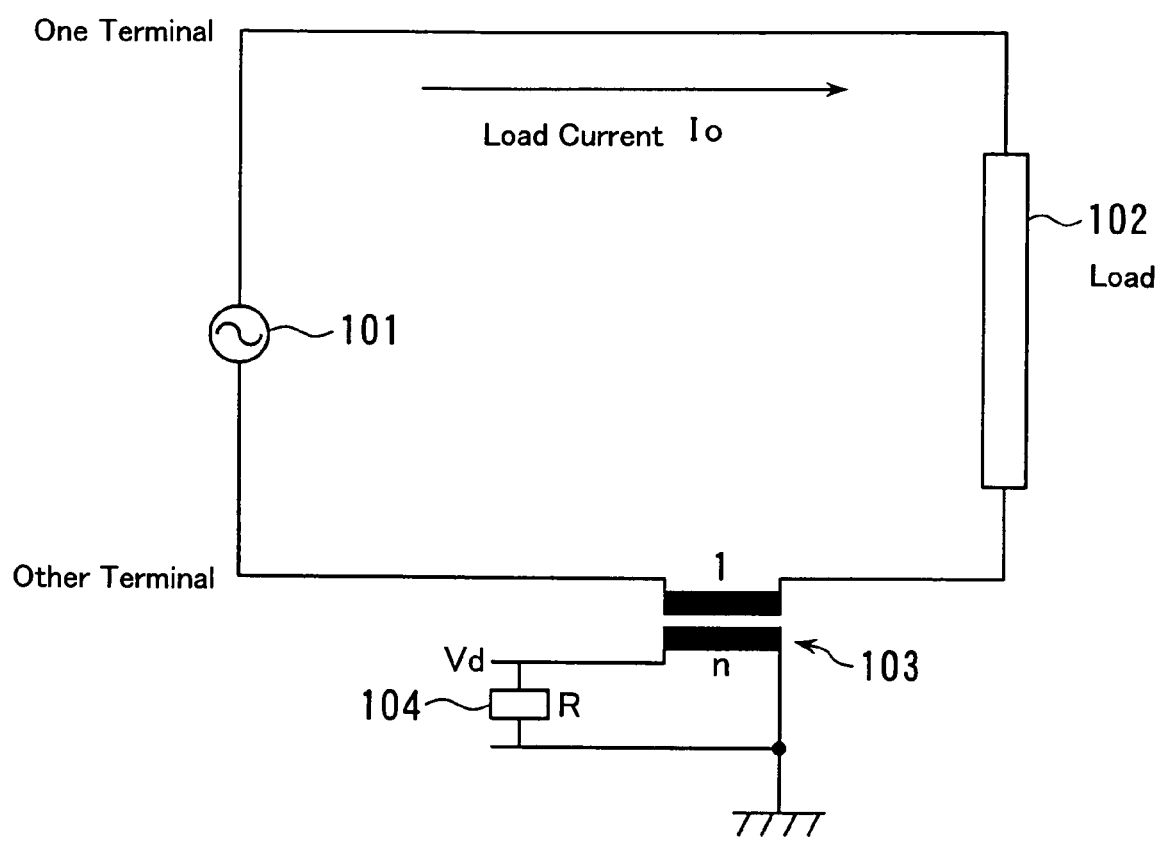
FIG. 4 is an explanatory diagram explaining current detection of a balanced output according to a conventional example.

FIG. 3 shows a piezoelectric transformer driving apparatus according to a third embodiment This piezoelectric transformer driving apparatus is constructed with transformers 11 and 12, piezoelectric transformers 2 and 3, a detection part 13, an error amplifier 14, an integrator 15, a V/F (voltage/frequency) converter 16, and an output circuit 17. In addition, in FIG. 3, since what are given the same reference numerals as FIG. 1 are the same, their descriptions will be omitted.

The transformer 11 is constructed with a primary winding 11A and a secondary winding 11B. When a high-frequency alternating current is applied to the primary winding 11A, the secondary winding 11B generates an alternating current (AC) drive voltage. The secondary winding 11B applies the drive voltage to the piezoelectric transformer 2. Similarly, the transformer 12 is constructed with a primary winding 12A and a secondary winding 12B. When a high-frequency AC is applied to the primary winding 12A, the secondary winding 12B generates an AC drive voltage. The secondary winding 12B applies the drive voltage to the piezoelectric transformer 3.

The detection part 13 is constructed with resistors 13A and 13D, diodes 13B and 13E, and a capacitor 13C. The resistor 13A and resistor 13D are connected in series. A terminal of the resistor 13A is connected to a middle point of the secondary winding 11B of the transformer 11, while a terminal of the resistor 13D is connected to a middle point of the secondary winding 12B of the transformer 12. Diodes 13B and 13E connected with their cathodes facing each other are connected between the terminal of the resistor 13A and the terminal of the resistor 13D. A capacitor 13C is connected between the junction of the diode 13B with diode 13E and the junction of the resistor 13A with resistor 13D. Furthermore, a junction of the diode 13B and diode 13E and a junction of the resistor 13A and resistor 13D are connected to the error amplifier 14.

When a high-frequency voltage is applied to the cold-cathode tube 201, the load current i3 flows. The load current i3 flows in order of the middle point of the secondary winding 12B of the transformer 12, the resistor 13D, the resistor 13A, then the middle point of the transformer 11B of the transformer 11, or flows in the reverse direction. When a voltage at the terminal of the resistor 13A becomes higher than the one at the terminal of the resistor 13D, the current which passed through the diode 13B charges the capacitor 13C. Also, when a voltage at the terminal of the resistor 13D becomes higher than the one at the terminal of the resistor 13A, the current which passed through the diode 13E charges the capacitor 13C. Thus, a voltage according to the load current i3 arises in the capacitor 13C. This voltage is applied to the error amplifier 14.

The error amplifier 14 has a reference voltage internally, and amplifies the difference voltages between the voltages of the capacitor 13C and this reference voltage. The integrator 15 integrates an output of the error amplifier 14. Then, a V/F converter 16 converts the voltages which the integrator 15 integrated, into AC control signals. Thus, the V/F converter 16 generates control signals at frequencies according to the load current i3. The output circuit 17 generates a high-frequency AC based on the control signals from the V/F converter 16, and applies this AC to the primary winding 11A of the transformer 11 and to the primary winding 12A of the transformer 12. In this way, feedback for preventing fluctuation in the load current i3 is formed by the detection part 13, the error amplifier 14, the integrator 15, and the V/F converter 16.

In this way, according to this embodiment, similarly to the first embodiment, the cold-cathode tube 201 can be driven, while the insulating component, such as a current transformer or a photocoupler needed in conventional technology is made unnecessary, and the load current i3 flowing in the cold-cathode tube 201 can be detected. In addition, according to this embodiment, since a high-frequency AC which the output circuit 17 outputs is adjusted according to the load current i3 detected in the detection part 13, it is possible to make the load current i3 constant.

INDUSTRIAL APPLICABILITY

As mentioned above, a piezoelectric transformer driving apparatus according to the present invention is useful for driving a load which does not have an earth point and is balanced to the ground, while detecting a load current which flows into this load.

The inventon claimed is:

1. A piezoelectric transformer driving apparatus characterized by comprising:
   two driving parts which generate AC drive voltages, respectively;
   a first piezoelectric transformer (2) which generates a high voltage AC from a drive voltage generated by one of the driving parts, and applies this AC to one terminal of a load;
   a second piezoelectric transformer (3) which generates a high voltage AC with polarity reverse to the first piezoelectric transformer (2), from a drive voltage generated by the other driving part, and applies this AC to the other terminal of the load; and
   a detection part (4) which is connected between the one of the driving parts and the other driving part, in which a load current flowing into the load flows, and which detects this load current.

2. The piezoelectric transformer driving apparatus according to claim 1, characterized in that the respective driving parts are secondary windings ($1A_2$ and $1B_2$) provided to primary windings ($1A_1$ and $1B_1$) of transformers (1A and 1B);
   that the primary winding ($1A_1$) of one of the transformers (1A) and the primary winding ($1B_1$) of the other (1B) transformer are connected with each other in series; and
   that the first piezoelectric transformer (2) is driven by an AC drive voltage generated by the secondary winding ($1A_2$) of the one of the transformers (1A), and the second piezoelectric transformer (3) is driven by a drive voltage generated by the secondary winding ($1B_2$) of the other transformer (1B).

3. The piezoelectric transformer driving apparatus according to claim 2, characterized in that the detection part (4) has a first resistor (4A) connected with the secondary winding ($1A_2$) of the one of the transformers (1A), and a second resistor (4B) which is connected with the secondary winding ($1B_2$) of the other transformer (1B) and is connected with the first resistor (4A) in series; and that a junction of the two resistors (4A and 4B) is grounded.

4. A piezoelectric transformer driving apparatus characterized by comprising:

two driving parts which generate AC drive voltages, respectively;

a first piezoelectric transformer (2) which generates a high voltage AC from a drive voltage generated by one of the driving parts, and applies this AC to one terminal of a load;

a second piezoelectric transformer (3) which generates a high voltage AC with polarity reverse to the first piezoelectric transformer (2), from a drive voltage generated by the other driving part, and applies this AC to the other terminal of the load; and a detection part (4) which is connected with one of the driving parts and detects a load current which flows into the load, from a current which flows between this driving part and the ground.

5. The piezoelectric transformer driving apparatus according to claim 4, characterized in that the respective driving parts are secondary windings ($1A_2$ and $1B_2$) provided to primary windings ($1A_1$ and $1B_1$) of transformers (1A and 1B);

that the primary winding ($1A_1$) of one of the transformers (1A) and the primary winding ($1B_1$) of the other transformer (1B) are connected with each other in series; and that the first piezoelectric transformer (2) is driven by an AC drive voltage generated by the secondary winding ($1A_2$) of the one of the transformers (1A), and the second piezoelectric transformer (3) is driven by a drive voltage generated by the secondary winding ($1B_2$) of the other transformer (1B).

6. The piezoelectric transformer driving apparatus according to claim 5, characterized in that the detection part (4) is a resistor (4A), one terminal of which is connected with the secondary winding ($1A_2$) of one of the transformers (1A), and the other terminal of which is grounded.

* * * * *